US012658599B2

(12) United States Patent
Hood et al.

(10) Patent No.: US 12,658,599 B2
(45) Date of Patent: *Jun. 16, 2026

(54) SYSTEMS AND METHODS FOR PROVIDING AN ANTENNA

(71) Applicant: L3Harris Global Communications, Inc., Rochester, NY (US)

(72) Inventors: James J. Hood, Victor, NY (US); James Buduson, North Chili, NY (US); Joseph Majkowski, Pittsford, NY (US); Peter Burke, Hilton, NY (US)

(73) Assignee: L3Harris Global Communications, Inc., Melbourne, FL (US)

( * ) Notice: Subject to any disclaimer, the term of this patent is extended or adjusted under 35 U.S.C. 154(b) by 39 days.

This patent is subject to a terminal disclaimer.

(21) Appl. No.: 18/906,666

(22) Filed: Oct. 4, 2024

(65) Prior Publication Data

US 2025/0030174 A1 Jan. 23, 2025

Related U.S. Application Data

(63) Continuation of application No. 18/063,818, filed on Dec. 9, 2022, now Pat. No. 12,176,618.

(51) Int. Cl.

| | |
|---|---|
| ***H01Q 21/06*** | (2006.01) |
| ***H01Q 9/04*** | (2006.01) |
| ***H01Q 15/14*** | (2006.01) |

(52) U.S. Cl.

CPC ......... *H01Q 21/062* (2013.01); *H01Q 9/0492* (2013.01); *H01Q 15/14* (2013.01); *H01Q 21/065* (2013.01)

(58) Field of Classification Search

CPC ...... H01Q 1/184; H01Q 1/526; H01Q 9/0485; H01Q 9/0492; H01Q 15/14; H01Q 21/062; H01Q 21/065

See application file for complete search history.

(56) References Cited

U.S. PATENT DOCUMENTS 4,079,379 A 3/1978 Piesinger
4,431,999 A 2/1984 Gutleber (Continued)

FOREIGN PATENT DOCUMENTS

| | | |
|---|---|---|
| EP | 2078324 | 5/2013 |
| WO | 2016067269 | 5/2016 |
| WO | 2016085554 | 6/2016 |

*Primary Examiner* — Tung X Le

(74) *Attorney, Agent, or Firm* — Fox Rothschild LLP; Carol E. Thorstad-Forsyth

(57) ABSTRACT

Systems and methods for operating an antenna assembly. The methods comprise: receiving, at the first polarized antenna, a first signal comprising a desired signal emitted from a first signal source located at a first altitude higher than a second altitude of the antenna assembly and an interfering signal emitted from a second signal source located at a third altitude lower than the second altitude; receiving the interfering signal at the second polarized antenna (where the first and second polarized antennas have opposite circular polarizations); generating a second signal by shifting a phase of the interfering signal which was received at the second polarized antenna by an amount to cause the second signal to be out-of-phase with the first signal; and providing an antenna pattern with a null at or below a horizon by destructively combining the second signal with the first signal.

20 Claims, 9 Drawing Sheets

(56) References Cited

U.S. PATENT DOCUMENTS

| | | | | |
|---|---|---|---|---|
| 6,229,488 | B1 | 5/2001 | Lin et al. | |
| 6,486,828 | B1 | 11/2002 | Cahn et al. | |
| 6,542,119 | B2 | 4/2003 | Howell et al. | |
| 6,819,291 | B1 | 11/2004 | Lackey et al. | |
| 7,126,538 | B2 * | 10/2006 | Sampo | H01Q 9/0407 343/900 |
| 7,450,082 | B1 | 11/2008 | Lopez | |
| 7,495,627 | B2 | 2/2009 | Parsche | |
| 8,049,667 | B2 | 11/2011 | Lackey | |
| 8,624,792 | B2 * | 1/2014 | Popugaev | H01Q 9/0407 343/846 |
| 9,692,141 | B2 * | 6/2017 | Orban | H01Q 21/26 |
| 10,424,836 | B2 | 9/2019 | McMichael et al. | |
| 11,196,147 | B2 | 12/2021 | Kim et al. | |
| 11,411,316 | B2 | 8/2022 | Panther et al. | |
| 11,502,414 | B2 * | 11/2022 | Parsche | H01Q 9/065 |
| 2008/0169993 | A1 | 7/2008 | Matsuzawa et al. | |
| 2014/0327591 | A1 | 11/2014 | Kokkinos | |
| 2018/0269577 | A1 | 9/2018 | Kosaka et al. | |
| 2020/0212569 | A1 | 7/2020 | Kumar et al. | |
| 2022/0255223 | A1 | 8/2022 | Tran et al. | |
| 2025/0047013 | A1 * | 2/2025 | Naraine | H01Q 21/26 |

* cited by examiner

SYSTEMS AND METHODS FOR PROVIDING AN ANTENNA

CROSS-REFERENCE TO RELATED APPLICATIONS

The present application is a Continuation of U.S. patent application Ser. No. 18/063,818 ("the '818 application") which was filed on Dec. 9, 2022. The present application claims priority to and the benefit of the '818 application. The content of the '818 application is incorporated by references in its entirety.

BACKGROUND

Unmanned aerial vehicles (UAVs) require global navigation satellite system (GNSS) (including global positioning system (GPS)) navigation or control uplink information to navigate to a target location. Current GPS anti-jam antenna solutions are not suitable for small UAV applications due to size, weight and power limitations. Radio frequency (RF) emissions expose the UAV and operator to detection, jamming and kinetic attacks.

SUMMARY

This document concerns implementing systems and methods for operating an antenna assembly. The methods comprise: receiving, at the first polarized antenna, a first signal comprising a desired signal emitted from a first signal source located at a first altitude higher than a second altitude of the antenna assembly and an interfering signal emitted from a second signal source located at a third altitude lower than the second altitude; receiving the interfering signal at the second polarized antenna; generating a second signal by shifting a phase of the interfering signal which was received at the second polarized antenna by an amount to cause the second signal to be out-of-phase with the first signal; and providing an antenna pattern with a null at or below a horizon by destructively combining the second signal with the first signal.

The first and second polarized antennas may be disposed on opposite sides of an antenna reflector and/or may have opposite polarizations. For example, the first polarized antenna comprises a circular polarized antenna which is right circular polarized and the second polarized antenna comprises a circular polarized antenna which is left circular polarized (or vice versa).

The desired signal may comprise a satellite signal and the interfering signal may comprise a terrestrial signal. The amplitudes of the satellite and terrestrial signals may be, for example, within N (e.g., ten) decibels of each other. The satellite signal may comprise a global navigation satellite system (e.g., a global positioning system signal). The phase of the interfering signal may be shifted by one hundred eighty degrees to provide the null at the horizon or may be shifted by less than one hundred eighty degrees to provide the null below the horizon. The first and second polarized antennas can include, but are not limited to, dipole antennas, patch antennas, a planar printed antenna, and/or conformal printed antenna. The antenna assembly may be disposed on an aerial vehicle such that the first polarized antenna is a skyward antenna and the second polarized antenna is a groundward antenna.

This document also concerns an antenna assembly. The antenna assembly comprises: an antenna reflector; a first polarized antenna disposed on the antenna reflector and having a first polarization; a second polarized antenna disposed on the antenna reflector and having a second polarization opposite to the first polarization; and a circuit configured to perform certain operations when the antenna assembly is in use. These operations involve: receiving, from the first polarized antenna, a first signal comprising a desired signal emitted from a first signal source located at a first altitude higher than a second altitude of the antenna assembly and an interfering signal emitted from a second signal source located at a third altitude lower than the second altitude; receiving the interfering signal from the second polarized antenna; generating a second signal by shifting a phase of the interfering signal which was received at the second polarized antenna by an amount to cause the second signal to be out-of-phase with the first signal; and providing an antenna pattern with a null at or below a horizon by destructively combining the second signal with the first signal.

In some scenarios, the circuit may comprise: a first hybrid combiner coupled to the first polarized antenna; a second hybrid combiner coupled to the second polarized antenna; a phase shifter coupled to the second hybrid combiner and configured to shift the phase of a signal output from the second hybrid combiner; and a third hybrid combiner configured to destructively combine a signal output from the first hybrid combiner and a signal output from the phase shifter.

This document further concerns a vehicle or electronic device (e.g., a communication device). The vehicle can include, but is not limited to, an aerial vehicle. The aerial vehicle comprises: a fuselage; and avionic electronics that are disposed in the fuselage. The avionic electronics comprise an electronic circuit configured to receive and transmit signals using an antenna assembly. The antenna assembly can include the antenna assembly described above. The aerial vehicle can include, but is not limited to, an unmanned aerial vehicle.

BRIEF DESCRIPTION OF THE DRAWINGS

This disclosure is facilitated by reference to the following drawing figures, in which like numerals represent like items throughout the figures.

DETAILED DESCRIPTION

Figure 1:
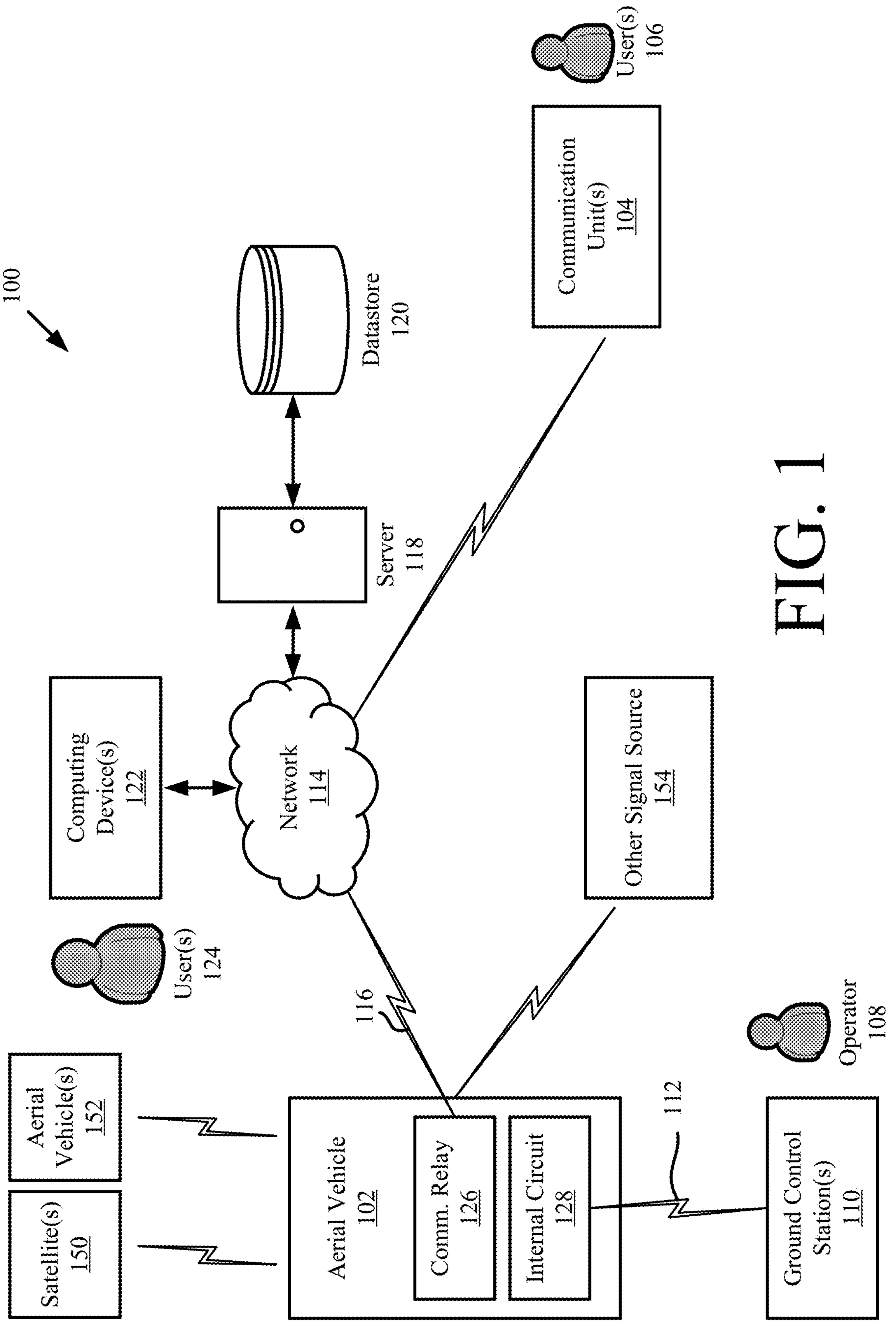
FIG. 1 provides an illustration of a system.

It will be readily understood that the solution described herein and illustrated in the appended figures could involve a wide variety of different configurations. Thus, the following more detailed description, as represented in the figures, is not intended to limit the scope of the present disclosure but is merely representative of certain implementations in different scenarios. While the various aspects are presented in the drawings, the drawings are not necessarily drawn to scale unless specifically indicated.

Reference throughout this specification to features, advantages, or similar language does not imply that all the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

As noted above, small UAVs require GPS navigation or control uplink information to navigate to a target location. Current GPS anti-jam antenna solutions are not suitable for small UAV applications due to size, weight and power limitations. RF emissions expose the UAV and operator to detection, jamming and kinetic attacks. Thus, a resilient GPS antenna is needed for minimizing undesired on-air signals.

Low profile antennas, lightweight antennas and resilient antennas do exist in conventional systems. However, these conventional antennas are not suitable for small UAV GPS antenna applications. For example, conventional single low profile antennas with a Low Noise Amplifier (LNA) and lightweight helical antennas are highly susceptible to interferences. Conventional patch array antenna systems and beam steering antennas having resiliency to interference, but are not low profile and lightweight. Beam steering antennas often require power.

The present solution addresses the above issues by providing a low profile, lightweight and resilient GPS antenna assembly that is suitable for small UAV applications and other applications. The GPS antenna is designed such that the size, weight and power limitations of the UAVs are satisfied even when the GPS antenna assembly is disposed therein. This is the case even in scenarios where the UAVs comprise Group 1 Small Unmanned Aircraft Systems (SUASs). A Group 1 SUAS comprises a back-packable UAV that can be used for Intelligence, Surveillance and Reconnaissance (ISR).

The present solution will be discussed below in relation to a UAV application. However, the present solution is not limited in this regard. The present solution can be used in other applications where an improved antenna is needed, such as other vehicle applications (e.g., manned or unmanned), mobile platform applications, robotic applications, communication device applications and/or other applications where GPS based locators are being employed to, for example, loiter munitions.

Referring now to FIG. 1, there is provided an illustration of a system 100 implementing the present solution. System 100 comprises aerial vehicles 102, 152, satellite(s) 150, communication device(s) 104, 122, ground control station(s) 110, and/or a server 118. The aerial vehicles 102, 152 may or may not have onboard human pilots, crew members and/or passengers. Each aerial vehicle 102, 152 can include, but is not limited to, an autonomous aerial vehicle, a remotely-piloted aerial vehicle, a UAV, and/or a manned aerial vehicle.

In the remotely-piloted scenarios, an operator 108 (e.g., a Remote Pilot In Command (RPIC)) can remotely control flight operations of the aerial vehicle by using ground control station 110 that is communicatively coupled to an internal circuit 128 of the aerial vehicle 102, 152 via command and control links 112. The internal circuit 128 includes the avionics payload. The avionics payload comprises avionic electronics, i.e., hardware and/or software facilitating positioning, navigation, timing and other functionalities of the aerial vehicle. The aerial vehicle can have any classification (e.g., a Group 1-5 classification, and/or size classification (e.g., very small, small, medium, and/or large).

Navigation of the aerial vehicle can be facilitated by satellite(s) 150. In this regard, the avionic electronics can include a locator configured to periodically or continuously determine the location of the aerial vehicle using satellite signals (e.g., GPS signals). The novel manner in which signals are received and processed by the locator will be discussed in detail below. The location may be reported to external devices such as other aerial vehicle(s) 152, ground control station 110 and/or server 118.

During flight, the aerial vehicle 102 can act as an airborne relay to wirelessly connect to communication unit(s) 104 (e.g., terrestrial radios) located on the ground at locations in which wireless communications therefrom are masked or screened by the LoS obstructions (e.g., distance, terrain (e.g., foliage and mountains) and human made objects (e.g., buildings)). In this regard, a communications relay 126 is provided with the aerial vehicle. The communications relay 126 may communicate over a secure communications link 116 (e.g., a Small Secure Data Link (SSDL)), use various frequency bands (e.g., Ultra High Frequency (UHF) and Very Hight Frequency (VHF) bands), support a variety of frequencies and waveforms, and extend the range between users 106 for voice and data communications (e.g., text messages and/or imagery data) beyond the LoS range of the communication unit(s) 104. The communication unit(s) 104 can include, but is (are) not limited to, radio transceiver(s), personal computer(s), portable computer(s), desktop computer(s), smart device(s) (e.g., a smart phone), tablet(s), and/or wearable device(s) (e.g., a smart watch and/or smart goggles).

The voice and data communications may be provided to remote devices such as computing device(s) 122 and/or server(s) 118 via network 114. Network 114 can include, but is not limited to, a radio network, a cellular network, and/or the Internet. The remote devices can process and/or output the voice and data communications to users 124 thereof. The voice communications, data communications and/or analytics relating thereto can be stored in a datastore 120.

Figure 2:
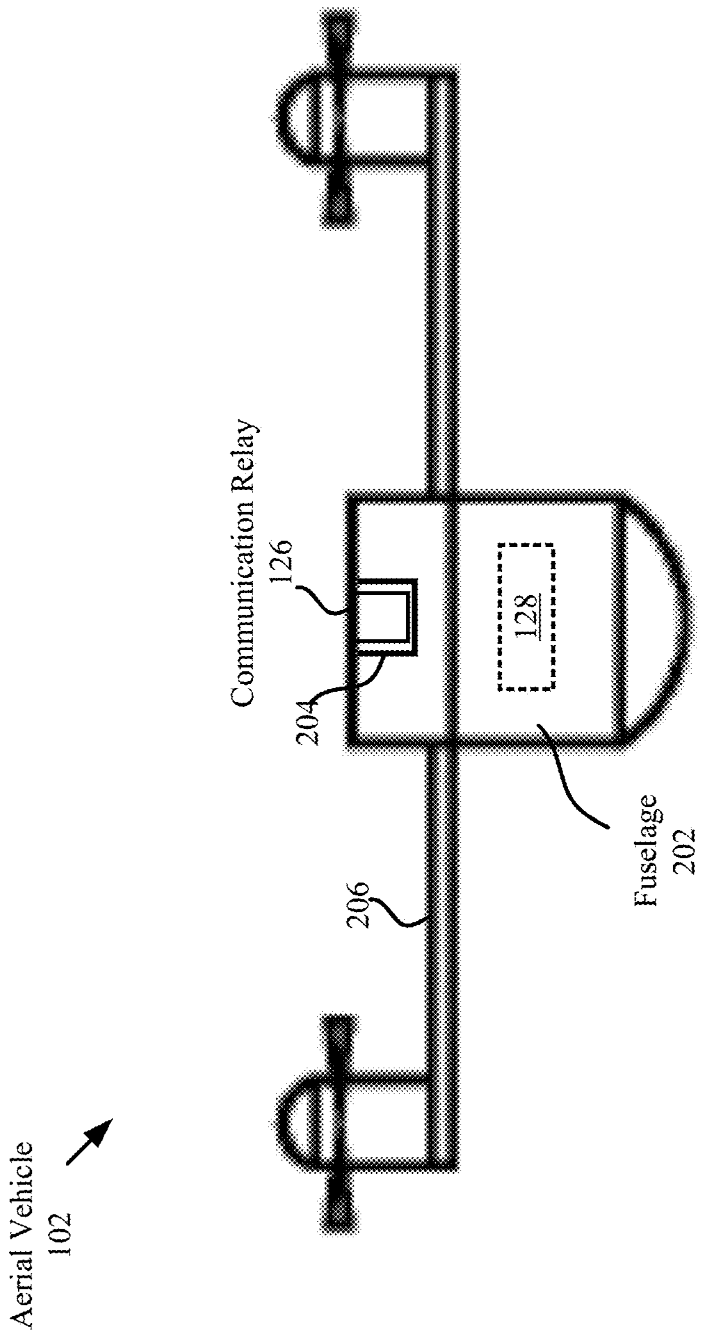
FIG. 2 provides an illustration of the aerial vehicle shown in FIG. 1.

Referring now to FIG. 2, there is shown an illustrative architecture for the aerial vehicle 102 of FIG. 1. Aerial vehicle(s) 152 may be the same as or similar to aerial vehicle 102. Thus, the discussion of aerial vehicle 102 is sufficient for understanding Aerial vehicle(s) 152.

The internal circuit 128 is disposed inside the fuselage 202 of the aerial vehicle, and the communication relay 126 is disposed in an existing compartment 204 formed in the fuselage 202 of the aerial vehicle. The compartment 204 is accessible from the outside of the aircraft (e.g., via a door or removable panel). A more detailed block diagram of the internal circuit 128 and communication relay 126 is provided in FIG. 3.

Figure 3:
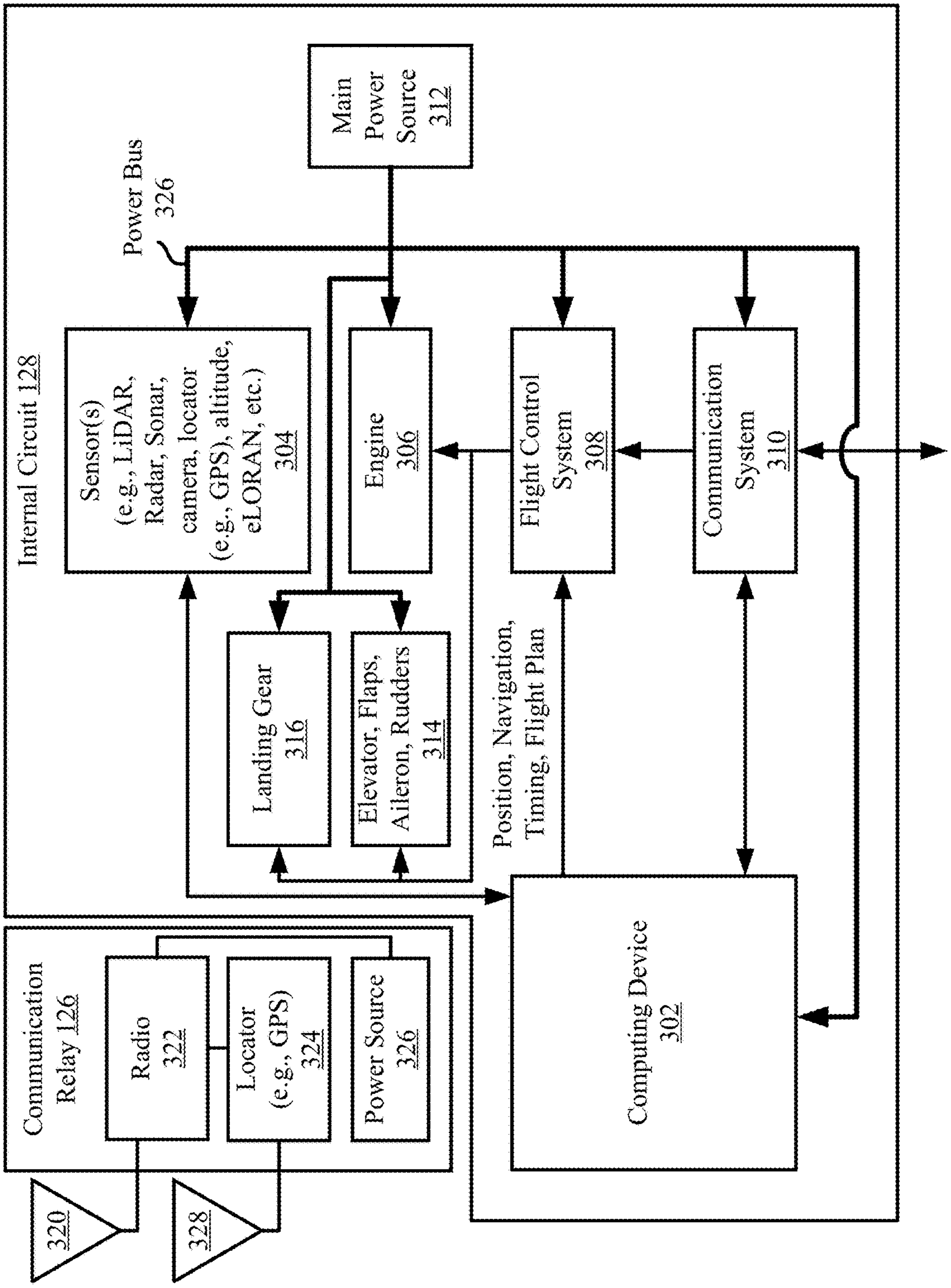
FIG. 3 provides an illustration of electronic components and/or circuits of the aerial vehicle shown in FIGS. 1-2.

As shown in FIG. 3, the internal circuit 128 comprises a computing device 302, sensor(s) 304, an engine 306, a flight control system 308, a communication system 310, a power source 312, elevators/flaps/ailerons/rudders 314, and landing gear 316. The internal circuit 128 can include more or less components than those shown and listed.

The computing device 302 comprises processor(s) that execute(s) instructions to perform at least the following operations: receiving and processing Position, Navigation and Timing (PNT) data from the sensor(s) 304; and/or facilitating flight operations by providing the PNT data and/or a flight plan to the flight control system 308 and/or the ground control station via communication system 310. The PNT data ensures that the operator and/or the aerial vehicle knows the aerial vehicle's current position at any given time. The flight plan ensures that the aerial vehicle knows its destination relative to its current position which is useful especially in autonomous aircraft applications.

The sensor(s) 304 can include, but are not limited to, a LiDAR system, a radar system, a sonar system, a camera, a locator (e.g., GPS device), an altitude sensor, and/or an eLORAN device. It should be noted that the locator of internal circuit 128 does provide information that facilitate the operator's 108 in determining the location of the aerial vehicle.

The communication system 310 provides a means to transmit PNT data and/or other information to the ground control station, and to receive command and control information from the ground control station. The command and control information is passed from the communication system 310 to the computing device 302 and/or the flight control system 308. The flight control system 308 controls operations of the engine 306, elevator/flaps/aileron/rudders 314, and/or landing gear 316 in accordance with the commands and control information received from the ground control station.

The components 302-310, 314, 316 are supplied power from a main power source 312. The main power source 312 can include, but is not limited to, a battery and/or an energy harvesting circuit (e.g., comprising a super capacitor to store harvested energy from heat, wind, light, RF signals, etc.). The power is supplied from the main power source 312 to components 302-310 via a power bus 326.

The communication relay 126 is independent from the internal circuit 128 and consists of a standalone payload for the aerial vehicle. The communication relay 126 may be supplied power from the main power source 312 of the aerial vehicle via power bus 326. Additionally or alternatively, the communication relay 126 is provided with another power source 326. Power source 326 can include, but is not limited to, a battery (e.g., a Lithium Polymer (LiPo) battery) and/or an energy harvesting circuit. Such a power source arrangement ensures that the components 322, 324 of the communication relay 126 continue to operate when the internal circuit 128 is no longer being supplied power from the main power source 312. The components include a radio 322 and a locator 324. The locator 324 can include, but is not limited to, a GPS device. Notably, the locator 324 provides a means to allow all users 106, 124 in a communication relay link to know the location of the aerial vehicle at any given time, and therefore provides these users with situational awareness (SA) information. Antennas 320, 328 are respectively provided for the radio 322 and locator 324.

Figure 4:
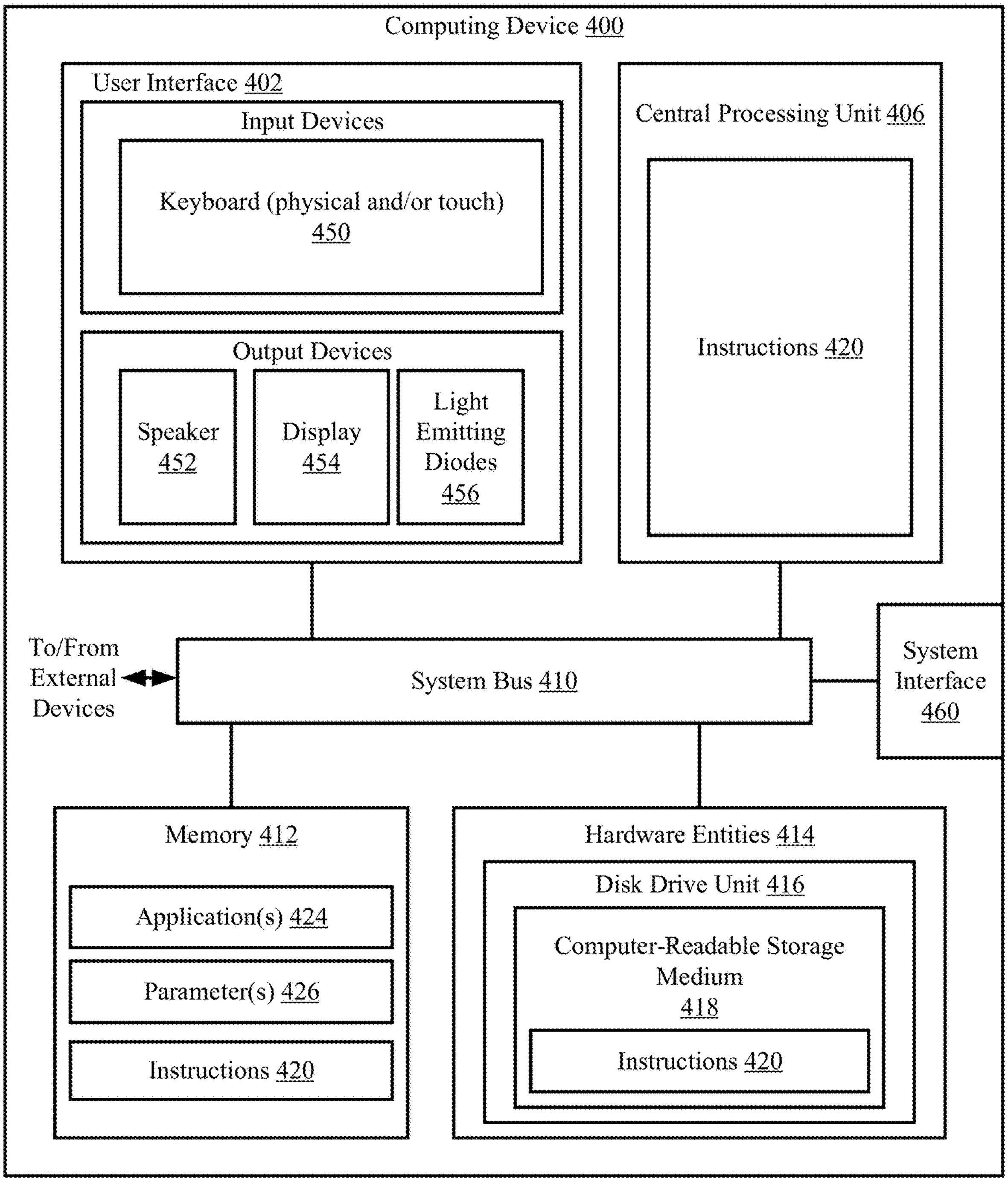
FIG. 4 provides a block diagram of an illustrative architecture for a computing device.

Referring now to FIG. 4, there is shown an illustrative architecture for a computing device 400. The communication unit(s) 104 of FIG. 1, ground control station 110 of FIG. 1, server 118 of FIG. 1, computing device(s) 122 of FIG. 1 and/or computing device 302 of FIG. 3 is/are the same as or similar to computing device 400. As such, the discussion of computing device 400 is sufficient for understanding the components 104, 110, 118, 122 of FIG. 1 and computing device 302 of FIG. 3.

Computing device 400 may include more or less components than those shown in FIG. 4. However, the components shown are sufficient to disclose an illustrative solution implementing the present solution. The hardware architecture of FIG. 4 represents one implementation of a representative computing device configured to receive information, process the receive information, transmit information and/or control operations of an aerial vehicle, as described herein. As such, the computing device 400 of FIG. 4 implements at least a portion of the method(s) described herein.

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit (CPU) 406, a system bus 410, a memory 412 connected to and accessible by other portions of computing device 400 through system bus 410, a system interface 460, and hardware entities 414 connected to system bus 410. The user interface can include input devices and output devices, which facilitate user-software interactions for controlling operations of the computing device 400. The input devices include, but are not limited to, a physical and/or touch keyboard 450. The input devices can be connected to the computing device 400 via a wired or wireless connection (e.g., a Bluetooth® connection). The output devices include, but are not limited to, a speaker 452, a display 454, and/or light emitting diodes 456. System interface 460 is configured to facilitate wired or wireless communications to and from external devices (e.g., network nodes such as access points, etc.).

At least some of the hardware entities 414 perform actions involving access to and use of memory 412, which can be a Random Access Memory (RAM), a disk drive, flash memory, a Compact Disc Read Only Memory (CD-ROM) and/or another hardware device that is capable of storing instructions and data. Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Figure 5:
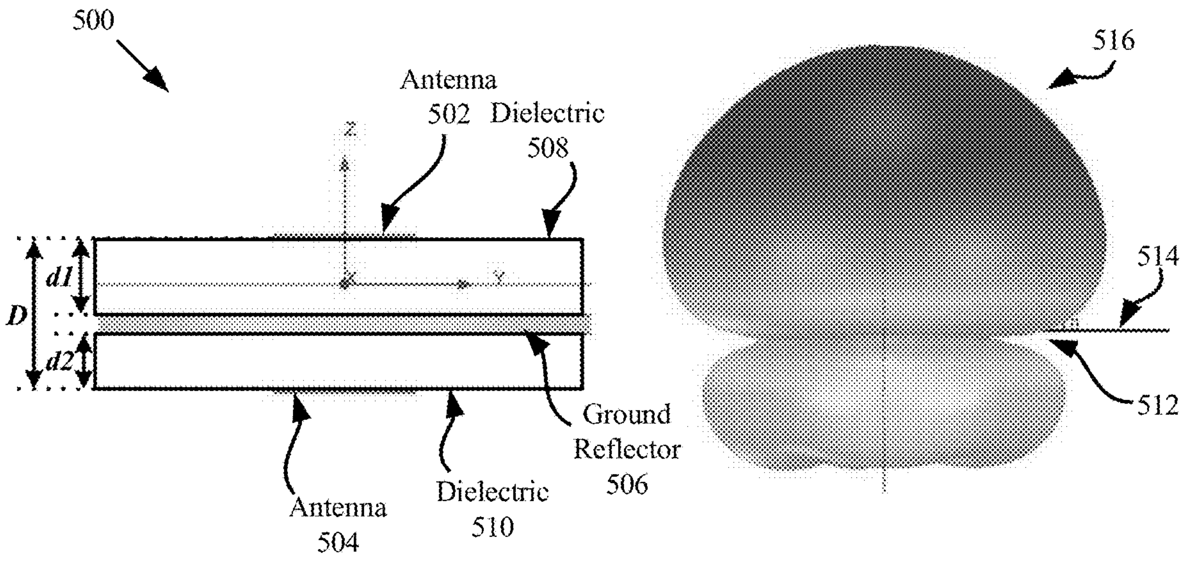
FIG. 5 provides an illustration of an antenna assembly and antenna radiation pattern.

Referring now to FIG. 5, there is provided an illustration that is useful for understanding an antenna assembly 500 in accordance with the present solution. The antenna assembly is described in relation to a GPS application. However, the present solution is not limited in this regard. The antenna can be used for other types of communications. In the GPS scenarios, the antenna assembly 500 can be employed in a communication relay (e.g., communication relay 126 of FIG. 1), an internal circuit (e.g., internal circuit 128 of FIG. 1) of an aerial vehicle, and/or a locator (e.g., locator 304 and/or 324 of FIG. 3). The antenna assembly 500 may have, for example in some scenarios, an overall height of less than five millimeters and an overall weight less than 30-60 gram (or 1-2 ounces).

The antenna assembly 500 comprises a two antenna omni-directional steerable-null phased array. The two antennas comprise an antenna 502 for receiving GPS signals broadcasted from satellites (e.g., satellites 150 of FIG. 1) and an antenna 504 for receiving interference signals emitted from ground device(s) (e.g., signal source 154 of FIG. 1). Antenna 502 is referred to herein as a skyward antenna, while antenna 504 is referred to herein as a groundward antenna.

The antennas 502 and 504 are arranged so as to be cross-polarized and circularly-polarized. The term "circularly-polarized" as used herein refers to a radio wave that rotates as the signal propagates. A circularly polarized antenna can radiate electromagnetic waves that spin clockwise or counter-clockwise. The circular polarization (CP) is referred to as right hand circular polarization (RHCP) when the radio wave rotates to the right (or clockwise direction) and a left hand circular polarization (LHCP) when the radio wave rotates to the left (or counter-clockwise direction). If the circular polarization is RHCP, then the cross-polarization is LHCP. In the GPS application, the skyward antenna is RHCP, while the groundward antenna is LHCP. In other applications, the skyward antenna may be LHCP and the groundward antenna may be RHCP. Each antenna 502, 504 can include, but is not limited to, a dipole antenna, a rectangular patch antenna (for example, fed orthogonally), a circular patch antenna, or other low profile antennas.

One or both antennas 502, 504 can be disposed on a support substrate in a linear (or straight) configuration or a conformal (or bent) configuration. The support substrate is not shown in FIG. 5 simply for ease of illustration. The support substrate can include, but is not limited to, a circuit board, a surface of a circuit housing, and/or a surface of a fuselage (e.g., fuselage 202 of FIG. 2).

The antennas are spaced apart from each other by a distance D. A ground reflector 506 and a dielectric layer 508 are disposed between the two antennas 502, 504. Antenna 502 is spaced apart from the ground reflector 506 by a distance d1, and antenna 504 is spaced apart from the ground reflector 506 by a distance d2. The distances d1 and d2 can be the same as or different than each other. The dielectric layer 508 can include air, a ceramic material or other non-conductive material. The distances D, d1 and d2 depend on the characteristics of materials(s) used for the dielectric layer 508. The size of the ground reflector 506 also depends on the characteristics of materials(s) used for the dielectric layer 508. The ground reflector 506 can have a planar shape, a convex shape, a concave shape, a tubular shape or other shape conformal to the support structure (e.g., the fuselage 202 of FIG. 2, a wing 206 of FIG. 2, or other component of the aerial vehicle).

During operation, signals from the two antennas 502, 504 are destructively combined out-of-phase. Antenna 502 is designed to have a gain pattern that favors satellite constellation, while antenna 504 is designed to act as an interference sampling antenna. The sampled interference signal is added out of phase with the satellite signal at a specific magnitude. This creates a steerable null 512 near the horizon 514, as shown by the antenna radiation pattern 516.

Figure 6:
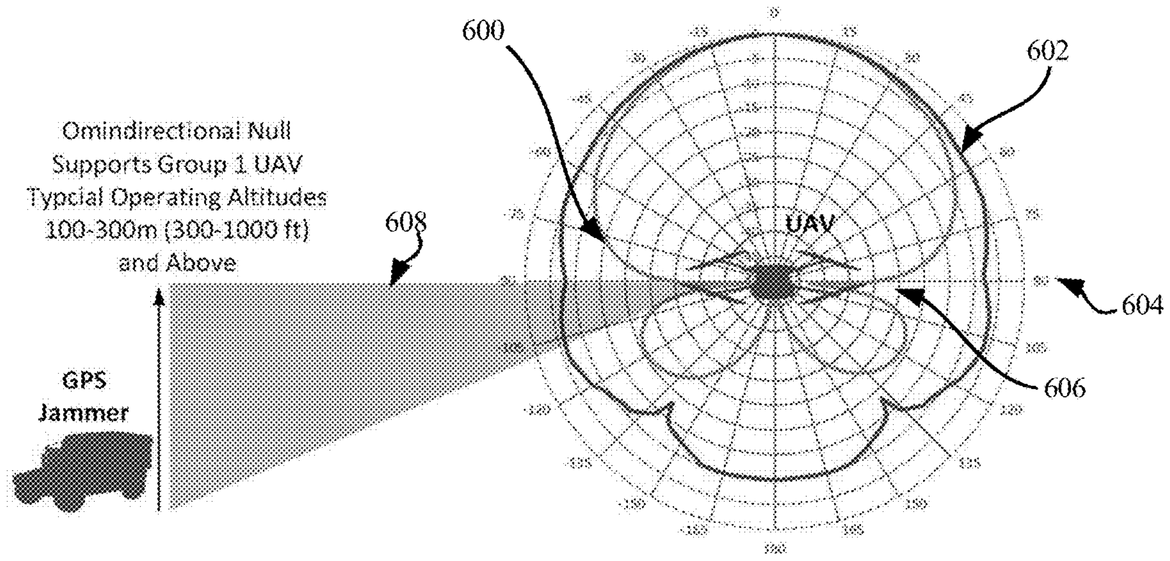
FIG. 6 provides an illustration that is useful for understanding a difference in an antenna radiation pattern of an antenna assembly of the present solution and an antenna radiation pattern of a conventional GPS antenna.

The antenna assembly 500 provides certain advantages over a traditional GPS antenna. In FIG. 6, an antenna radiation pattern 600 for the antenna assembly 500 is shown in conjunction with an antenna radiation pattern 602 for a conventional GPS antenna. The antenna radiation patterns 600, 602 are shown in polar coordinates. The conventional GPS antenna will receive an interfering signal on or below the horizon 604 of the elevation plane. In contrast, the antenna assembly 500 does not receive an interfering signal in the grey area 608 since it has a null 606 at the horizon 604. Thus, the antenna assembly 500 provides a system in which received signals of interest are less impacted by interfering signals as compared to signals received by conventional GPS antennas. In some applications, the omnidirectional null 606 also allows the antenna assembly 500 to support Group 1 SUASs that have typical operating altitudes of 100-300 meters (or 300-1000 feet) and above, as shown in FIG. 6. The present solution is not limited to these altitudes, Group 1 SUAS applications and/or the particulars of FIG. 6.

Figure 7:
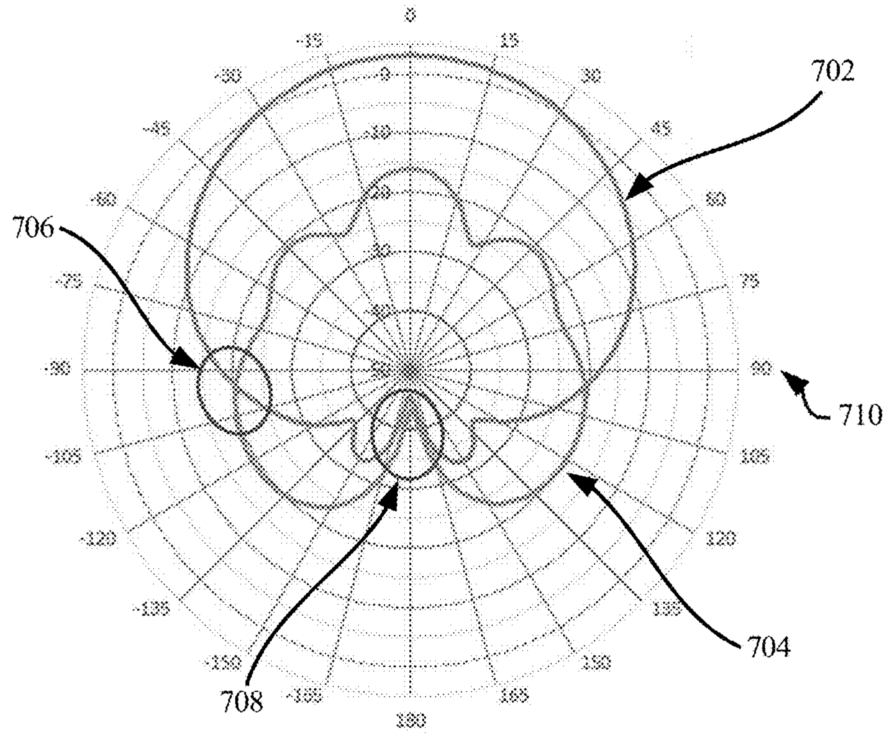
FIG. 7 provides an illustration that is useful for understanding how destructive interference between signals from two antennas can cause a desired radiation pattern to minimize interference from an interfering signal (e.g., a jammer signal).

FIG. 7 shows antenna radiation patterns for the two antennas of the antenna assembly 500. More particularly, an antenna radiation pattern 702 for the skyward antenna 502 is shown in conjunction with an antenna radiation pattern 704 for the groundward antenna 504. The goal of the present solution is for the amplitudes of signals that can be received by the antennas to be within N decibels of each other in areas 706, 708 so as to provide a desired amount of destructive interference (i.e., combine the signals when out-of-phase with each other) to cause a resulting radiation pattern in which signal interference from undesirable signals is minimized. Signal interference can be minimized when a null is provided in one or more desired areas. For example, a null can be provided in area 706 between polar coordinates −90 and −105 and/or an area 708 between polar coordinates −165 to +165. The value of N is selected in accordance with a given application. In some applications, N is selected to be ten such that signal amplitudes in areas 706, 708 are equal to or less than ten decibels (i.e., ≤10 db) of each other. The phasing between each antenna is selected to optimize for the desired null location. For example, in some cases, the phase may be selected to be +10° from 180° between each antenna. The present solution is not limited in this regard.

Figure 8:
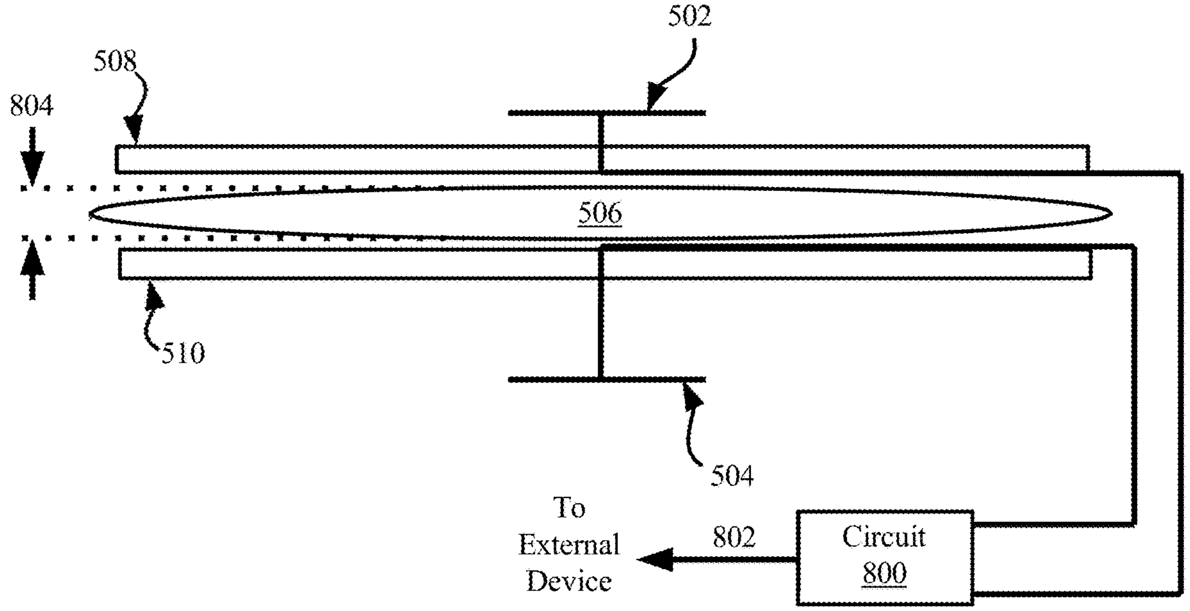
FIG. 8 provides a more detailed illustration of the antenna assembly coupled to a circuit.

A more detailed illustration of the antenna assembly 500 is provided in FIG. 8. Both antennas 502, 504 are coupled to a circuit 800. The circuit 800 comprises a transmit portion and a receive portion. The following discussion will focus on the receive portion. Thus, the arrow 802 out of block 800 illustrates a connection between the circuit and an external device (e.g., devices 302 and/or 322 of FIG. 3). The thickness 804 of the ground reflector 506 is selected to facilitate a best match between the two bottom horizon antenna radiation patterns which results in the desired destructive signal interference.

Figure 9:
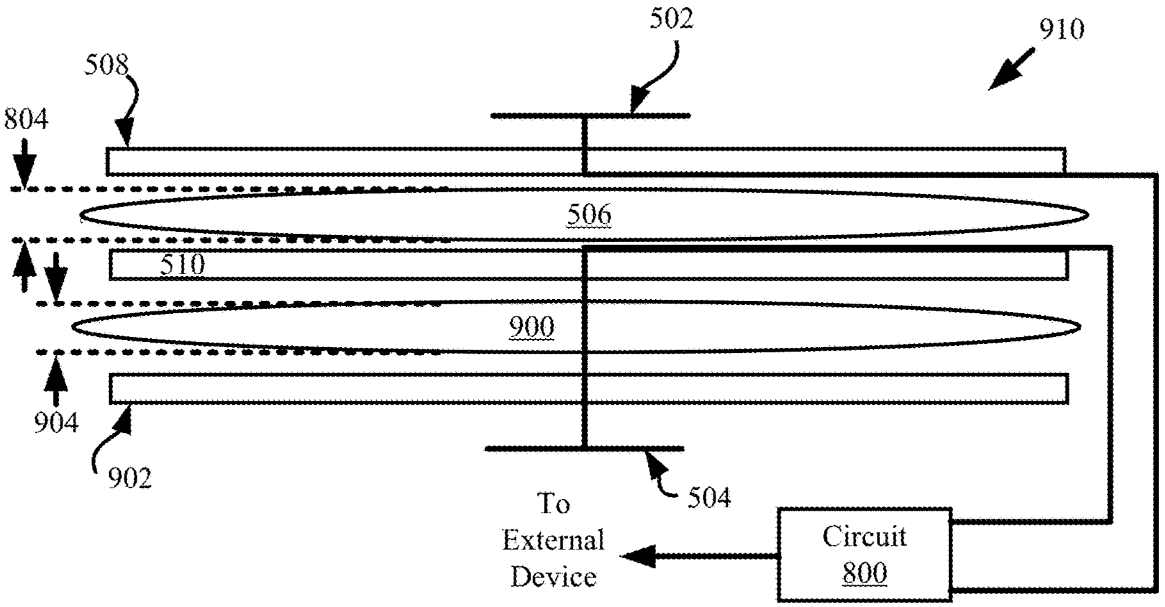
FIGS. 9-10 each provide an illustration of another architecture for the antenna assembly.
Figure 10:
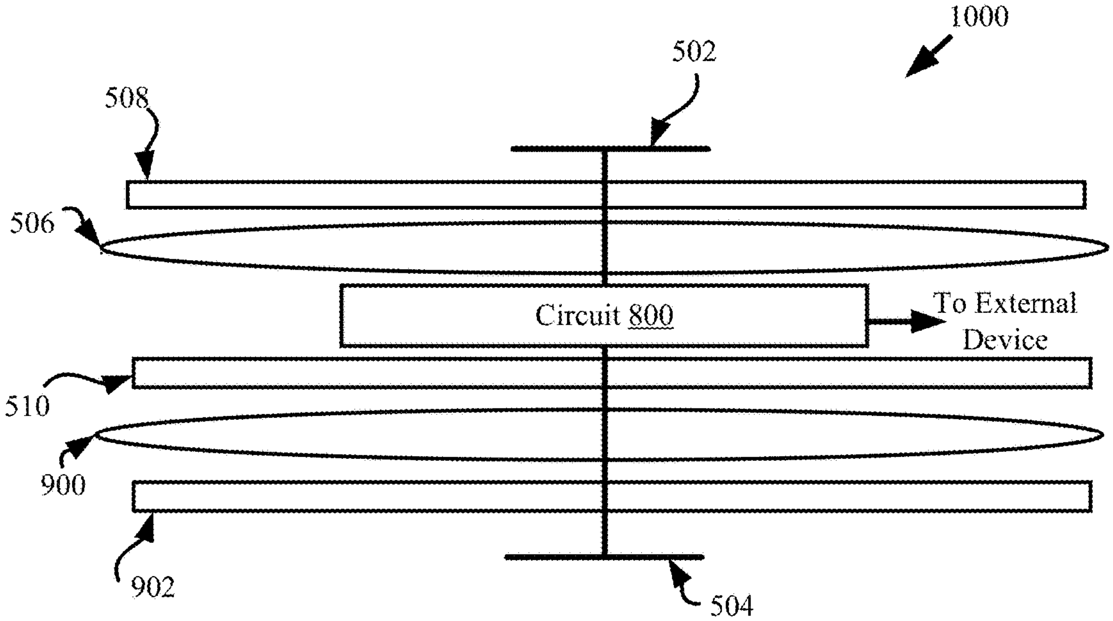

The antenna assembly 500 has been described above as having a single ground reflector and two dielectric layers. The present solution is not limited in this regard. In other scenarios, two ground reflectors 506, 900 and three dielectric layers 508, 510, 902 may be provided with the antenna assembly as shown in FIGS. 9-10. The thicknesses 804, 904 of the ground reflectors 506, 900 can be the same or different. The thicknesses 804, 904 can be selected to facilitate a best match between the two bottom horizon antenna radiation patterns which results in the desired destructive signal interference. The location of the circuit 800 can be the same as that of FIG. 8 as shown in FIG. 9 or different than that of FIG. 8 as shown in FIG. 10. In FIG. 10, the circuit 800 is located between the ground reflectors 506, 900 rather than being remote from or otherwise offset from the same.

Figure 11:
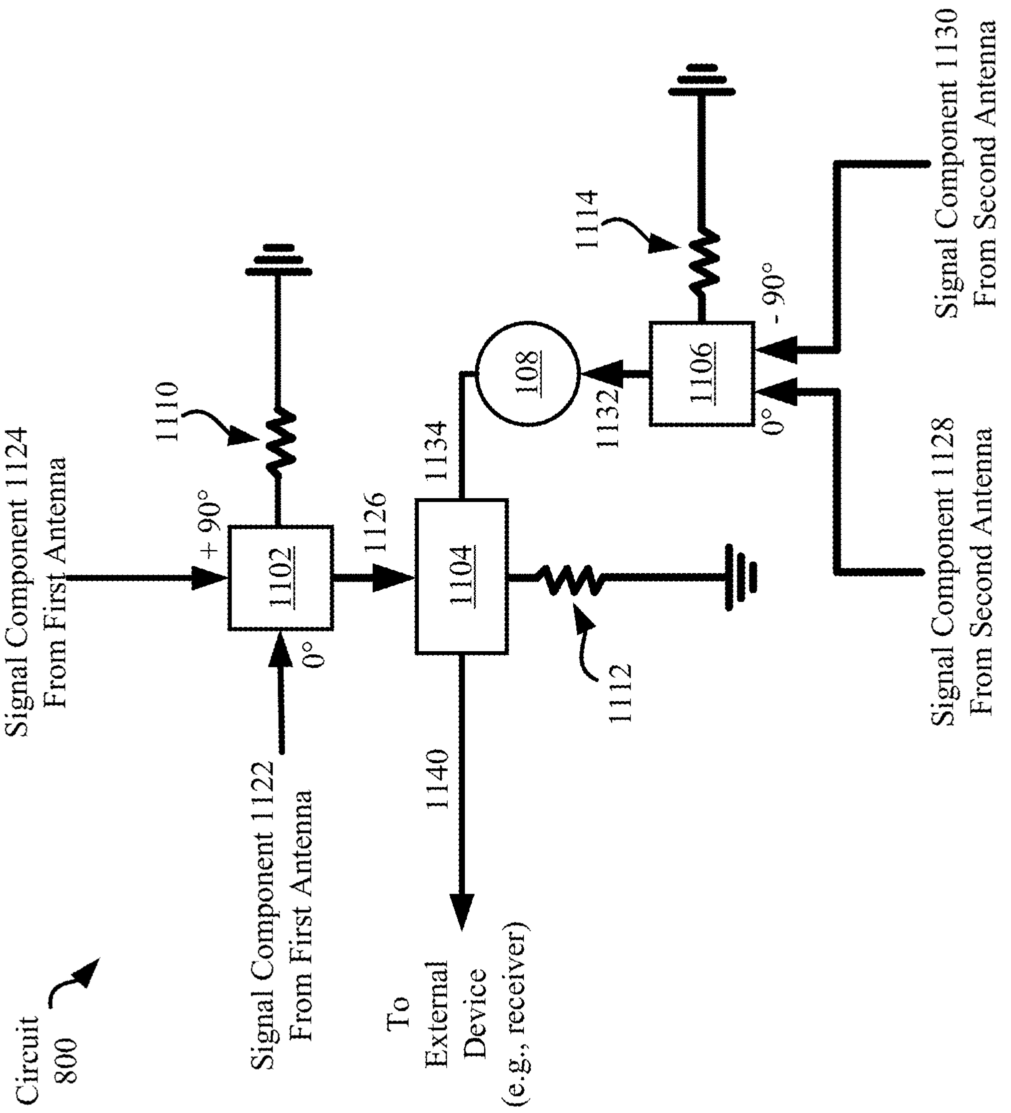
FIG. 11 provide a more detailed block diagram of the circuit for the antenna assembly.

A more detailed block diagram for circuit 800 is provided in FIG. 11. As shown in FIG. 11, circuit 800 comprises hybrid combiners 1102, 1104, 1106, a phase shifter 1108 and resistors 1110, 1112, 1114. The resistor 1110 is provided to match the input and output impedances of hybrid combiner 1102. Similarly, resistors 1112, 1114 are provided to match the input and output impedances of hybrid combiners 1104, 1106, respectively.

Each hybrid combiner comprises an adder circuit that is used to combine signals from antennas 502, 504. Hybrid combiner 1102 is connected to a first antenna (e.g., RHCP antenna 502 of FIG. 5), while hybrid combiner 1106 is connected to a second antenna (e.g., LHCP antenna 504 of FIG. 5). The first and second antennas have opposite circular polarizations, and are therefore considered cross-polarized. The first antenna has an RHCP while the second antenna has an LHCP. The output from the first antenna comprises two signal components 1122, 1124 that have equal magnitudes and are out-of-phase by ninety degrees (90°). The hybrid combiner 1102 combines the signal components 1122, 1124 to create a combined signal 1126.

The output from the second antenna comprises two signal components 1128, 1130 that have equal magnitudes and are out-of-phase by ninety degrees (90°). The hybrid combiner 1106 combines the signal components 1128, 1130 to create a combined signal 1132. The combined signal 1132 is passed to the phase shifter 108 where its phase is shifted to produce signal 1134 which is out-of-phase with combined signal 1126. The phase of the combined signal 1132 can be shifted by, for example, one hundred eighty degrees (180°), less than one hundred eight degrees (<180°), by an amount between one hundred seventy degrees and one hundred ninety degrees (170-190°) (inclusive of end values), and/or by an amount between other angles selected in accordance with a particular application. For example, the phase is shifted by one hundred eight degrees when a null is desired at the horizon, or less than one hundred eight degrees when the null is desired below the horizon.

The two out-of-phase signals 1126, 1134 are combined by hybrid combiner 1104 to produce signal 1140. Signal 1140 is passed to an external device (for example, a receiver of a GPS locator or sensor).

Figure 12:
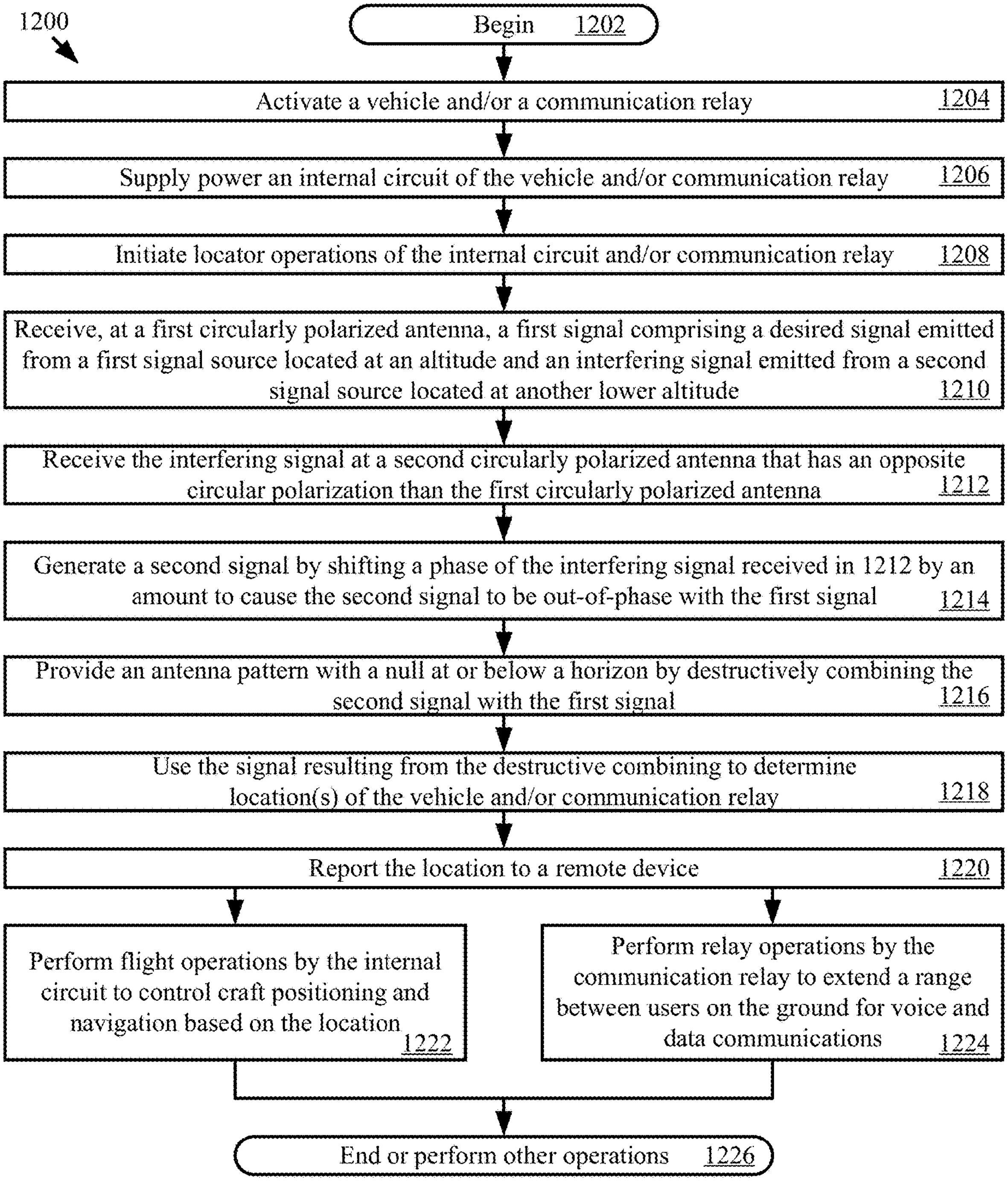
FIG. 12 provides a flow diagram of an illustrative method for operating an antenna assembly.

Referring now to FIG. 12, there is provided a flow diagram of an illustrative method 1200 for operating an antenna assembly (e.g., antenna assembly 500 of FIG. 5), a communication device (e.g., GPS locator 304 and/or 324 of FIG. 3), and/or a vehicle (e.g., aerial vehicle 102 of FIG. 1). Method 1200 begins with 1202 and continues with 1204 where the vehicle and/or communication relay (e.g., communication relay 126 of FIG. 1) is/are activated or otherwise enabled. Consequently, power is suppled to an internal circuit (e.g., internal circuit 128 of FIG. 1) of the vehicle and/or an internal circuit (e.g., circuit 322, 324 of FIG. 3) of the communication relay, as shown by 1206.

One or more locators (e.g., locators 304, 324 of FIG. 3) are provided with the internal circuits. The locator(s) can include, but is (are) not limited to, GPS based locator(s). At least one locator comprises an antenna assembly (e.g., antenna assembly 500 of FIG. 5, 910 of FIG. 9 or 1000 of FIG. 10) in accordance with the present solution. The antenna assembly comprises a first circularly polarized antenna (e.g., antenna 502 of FIG. 5) and a second circularly polarized antenna (e.g., antenna 504 of FIG. 5) that are disposed on opposite sides of an antenna reflector (e.g., antenna reflector 506 of FIGS. 5 and/or 900 of FIG. 9). The first and second circularly polarized antennas having opposite circular polarizations. For example, the first circularly polarized antenna is right circular polarized and the second circularly polarized antenna is left circular polarized.

Next in 1208, locator operations are initiated or otherwise enabled. The locator operations are performed in blocks 1210-1218. The operations of 1210 involve receiving a first signal at the first circularly polarized antenna. The first signal comprises: (i) a desired signal emitted from a first signal source (e.g., satellite 150 of FIG. 1) located at a first altitude higher than a second altitude of the locator and/or antenna assembly; and (ii) an interfering signal emitted from a second signal source (e.g., signal source 154 of FIG. 1) located at a third altitude equal to or lower than the second altitude of the locator and/or antenna assembly. The desired signal can include, but is not limited to, a satellite signal and/or a GPS signal. The interfering signal can include, but is not limited to, a terrestrial signal (e.g., a signal emitted from a ground based source). In some scenarios, amplitudes of the desired signal and the interfering signal may be within ten decibels of each other.

The operations of 1212-1216 involve: receiving the interfering signal at the second circularly polarized antenna; generating a second signal by shifting a phase of the interfering signal (e.g., by ≤180°) which was received at the second circularly polarized antenna by an amount to cause the second signal to be out-of-phase with the first signal; and providing an antenna pattern with a null at or below a horizon by destructively combining the second signal with the first signal. The null may be provided at the horizon when the phase is shifted by one hundred eighty degrees, and below the horizon when the phase is shifted by less than one hundred eighty degrees.

Upon completing 1216, method 1200 continues with 1218 where the signal resulting from the destructive combining is used to determine location(s) of the vehicle and/or communication relay. The location(s) may be reported to a remote device (e.g., ground control station(s) 110 of FIG. 1) in 1220. The location(s) may also be used in 1222 to perform flight operation by the internal circuit of the vehicle (e.g., an aerial vehicle) to control craft positioning and navigation. While the aerial vehicle is in flight, the communication relay may perform relay operations in 1224 to extend a range between users on the ground for voice and data communications. Subsequently, 1226 is performed where method 1200 ends or other operations are performed (e.g., return to 1202).

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form “a”, “an”, and “the” include plural references unless the context clearly dictates otherwise. Unless defined otherwise, all technical and scientific terms used herein have the same meanings as commonly understood by one of ordinary skill in the art. As used in this document, the term “comprising” means “including, but not limited to”.

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for operating an antenna assembly, comprising:

receiving, at the first polarized antenna, a first signal comprising a desired signal emitted from a first signal source located at a first altitude higher than a second altitude of the antenna assembly and an interfering signal emitted from a second signal source located at a third altitude lower than the second altitude;

receiving the interfering signal at the second polarized antenna, the first and second polarized antennas having opposite polarizations;

generating a second signal by shifting a phase of the interfering signal which was received at the second polarized antenna by an amount to cause the second signal to be out-of-phase with the first signal; and providing an antenna pattern with a null at or below a horizon by destructively combining the second signal with the first signal.

2. The method according to claim 1, wherein the first polarized antenna is right circular polarized and the second polarized antenna is left circular polarized.

3. The method according to claim 1, wherein the desired signal comprises a satellite signal and the interfering signal comprises a terrestrial signal.

4. The method according to claim 3, wherein amplitudes of the satellite and terrestrial signals are within N decibels of each other.

5. The method according to claim 3, wherein the satellite signal comprises a global navigation satellite system.

6. The method according to claim 1, wherein the phase of the interfering signal is shifted by one hundred eighty degrees to provide the null at the horizon or shifted by less than one hundred eighty degrees to provide the null below the horizon.

7. The method according to claim 1, wherein the first and second polarized antennas comprise dipole antennas, patch antennas or low profile antennas.

8. The method according to claim 1, wherein the antenna assembly is disposed on an aerial vehicle such that the first polarized antenna is a skyward antenna and the second polarized antenna is a groundward antenna.

9. An antenna assembly, comprising:

an antenna reflector;

a first polarized antenna disposed on the antenna reflector and having a first polarization;

a second polarized antenna disposed on the antenna reflector and having a second polarization opposite to the first polarization; and a circuit configured to perform the following operations when the antenna assembly is in use:

receive, from the first polarized antenna, a first signal comprising a desired signal emitted from a first signal source located at a first altitude higher than a second altitude of the antenna assembly and an interfering signal emitted from a second signal source located at a third altitude lower than the second altitude;

receive the interfering signal from the second polarized antenna;

generate a second signal by shifting a phase of the interfering signal which was received at the second polarized antenna by an amount to cause the second signal to be out-of-phase with the first signal; and provide an antenna pattern with a null at or below a horizon by destructively combining the second signal with the first signal.

10. The antenna assembly according to claim 9, wherein the first polarized antenna is right circular polarized and the second polarized antenna is left circular polarized.

11. The antenna assembly according to claim 9, wherein the desired signal comprises a satellite signal and the interfering signal comprises a terrestrial signal.

12. The antenna assembly according to claim 11, wherein amplitudes of the satellite and terrestrial signals are within N decibels of each other.

13. The antenna assembly according to claim 11, wherein the satellite signal comprises a global navigation satellite system.

14. The antenna assembly according to claim 9, wherein the phase of the interfering signal is shifted by one hundred eighty degrees to provide the null at the horizon or shifted by less than one hundred eighty degrees to provide the null below the horizon.

15. The antenna assembly according to claim 9, wherein the first and second polarized antennas comprise dipole antennas or patch antennas.

16. The antenna assembly according to claim 9, wherein the antenna assembly is disposed on an unmanned aerial vehicle such that the first polarized antenna is a skyward antenna and the second polarized antenna is a groundward antenna.

17. The antenna assembly according to claim 9, wherein the circuit comprises:

a first hybrid combiner coupled to the first polarized antenna;

a second hybrid combiner coupled to the second polarized antenna;

a phase shifter coupled to the second hybrid combiner and configured to shift the phase of a signal output from the second hybrid combiner; and a third hybrid combiner configured to destructively combine a signal output from the first hybrid combiner and a signal output from the phase shifter.

18. An aerial vehicle, comprising:

a fuselage;

avionic electronics that are disposed in the fuselage and comprise an electronic circuit configured to receive and transmit signals using an antenna assembly, the antenna assembly comprising:

an antenna reflector;

a first polarized antenna disposed on the antenna reflector and having a first polarization;

a second polarized antenna disposed on the antenna reflector and having a second circular polarization opposite to the first polarization; and a circuit configured to perform the following operations when the antenna assembly is in use:

receive, from the first polarized antenna, a first signal comprising a desired signal emitted from a first signal source located at a first altitude higher than a second altitude of the antenna assembly and an interfering signal emitted from a second signal source located at a third altitude lower than the second altitude;

receive the interfering signal from the second circularly antenna;

generate a second signal by shifting a phase of the interfering signal which was received at the second polarized antenna by an amount to cause the second signal to be out-of-phase with the first signal; and provide an antenna pattern with a null at or below a horizon by destructively combining the second signal with the first signal.

19. The aerial vehicle according to claim 18, wherein the antenna assembly is disposed in the fuselage such that the first polarized antenna is a skyward antenna and the second polarized antenna is a groundward antenna.

20. The aerial vehicle according to claim 18, wherein the vehicle comprises an unmanned aerial vehicle.

* * * * *